United States Patent
McClure

(10) Patent No.: US 9,549,506 B2
(45) Date of Patent: Jan. 24, 2017

(54) HARVESTER WITH REAR ACTIVE BOTTOM FLOOR

(71) Applicant: CNH Industrial America LLC, New Holland, PA (US)

(72) Inventor: John R. McClure, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 150 days.

(21) Appl. No.: 14/469,824

(22) Filed: Aug. 27, 2014

(65) Prior Publication Data
US 2016/0057937 A1    Mar. 3, 2016

(51) Int. Cl.
*A01F 15/10*    (2006.01)
*A01F 15/08*    (2006.01)

(52) U.S. Cl.
CPC ............ *A01F 15/08* (2013.01); *A01F 15/106* (2013.01); *A01F 2015/107* (2013.01)

(58) Field of Classification Search
CPC combination set(s) only.
See application file for complete search history.

(56) References Cited

U.S. PATENT DOCUMENTS

| 4,275,550 | A | 6/1981 | Swenson et al. |
| 4,862,684 | A | 9/1989 | Naaktgeboren et al. |
| 5,819,517 | A | 10/1998 | Amanatidis et al. |
| 6,769,239 | B1 * | 8/2004 | Webb ............... A01D 90/04 56/341 |
| 7,584,594 | B2 | 9/2009 | Viaud |
| 9,226,452 | B2 | 1/2016 | Biziorek |
| 2014/0096692 | A1 | 4/2014 | Baldauf |
| 2016/0001294 | A1 | 1/2016 | Bergmann et al. |

FOREIGN PATENT DOCUMENTS

| DE | 3714047 A1 * | 11/1988 | ............ A01D 90/04 |
| DE | EP 1062860 A2 * | 12/2000 | ............ A01F 15/10 |
| FR | 2692431 | 12/1993 | |
| FR | 2783130 | 3/2000 | |

* cited by examiner

*Primary Examiner* — Alicia Torres
(74) *Attorney, Agent, or Firm* — Patrick Sheldrake; Peter Zacharias

(57) ABSTRACT

A harvester assembly has a feeder assembly, a bottom floor assembly, and a crop collection channel. The rear portion of the bottom floor assembly is capable of variable movement to facilitate the passage of crop material through the crop collection channel with a reduced risk of clogging or plugging of the channel.

14 Claims, 7 Drawing Sheets

HARVESTER WITH REAR ACTIVE BOTTOM FLOOR

TECHNOLOGY FIELD

The present disclosure relates generally to a crop feeding system in a harvester, particularly to connections that allow for the movement of a bottom floor assembly which constitutes the bottom floor of a crop feeding channel, and to a related system that communicates information on the bottom floor assembly to an operator.

BACKGROUND

For many years harvesters, such as agricultural balers, have been used to consolidate and package crop material so as to facilitate the storage and handling of the crop material for later use. Usually, a mower-conditioner cuts and conditions the crop material for windrow drying in the sun. When the cut crop material is properly dried, a harvester, such as a round baler, the most frequently used in the industry, travels along the windrows to pick up the crop material and form it into cylindrically-shaped round bales.

More specifically, the cut crop material is gathered at the front of the baler from along the ground, onto a pickup assembly, and into a crop feeding channel where the material can be further cut before being introduced into a bale-forming chamber. Traditionally, the crop feeding channel is more narrow than the surrounding areas of the harvester, and clogging or plugging of the crop feeding channel is a common problem, especially if the harvester is being operated at higher speeds and thus passing greater amounts of crop material through the crop feeding channel at a given time. Once a clog occurs, the harvester must be stopped for the crop feeding channel to be cleared, reducing harvesting efficiency.

One method to prevent clogging is to design a harvester with a limited amount of movement of the bottom floor of the crop feeding channel. The bottom floor physically supports the crop material as it passes through the crop feeding channel and is cut by a rotor and knives before being moved to the bale forming chamber. By allowing the bottom floor to move, it can temporarily increase the volume of crop material that can be passed through the crop feeding channel, possibly preventing the formation of a clog. Once such example is described in U.S. Pat. No. 5,819,517, where the bottom floor of a crop feeding channel is allowed limited movement at the front end of the bottom floor, where the crop material would enter the crop feeding channel. This limited movement is accomplished by a spring that provides tension between the frame of the harvester and the front end of the bottom floor. If the pressure of the crop material in the crop feeding channel is great enough, the front end of the bottom floor will move downward, allowing additional crop material to pass through the channel. One disadvantage of this system is that the rear of the bottom floor remains static, so that while the volume of the crop feeding channel will increase towards the front, this larger amount of crop material must still pass through a fixed volume rearward to the rotary cutter. This frontside movement greatly increases the likelihood of clogs at a narrow outlet of the crop feeding channel and does not address the fundamental problem of accommodating more crop through the passageway defined by a drop floor. Additionally, in this arrangement the crop cutting knives remain static, and cannot compensate for increased crop material volume.

Another example is described in U.S. Pat. No. 7,584,594, in which both the front and the rear of the bottom floor of a feeding assembly provide limited movement. Movement at the front of the bottom floor is accomplished by a slotted guide and the rear by a hydraulic cylinder, such that when the rear of the bottom floor moves downward, so too will the front of the bottom floor. One disadvantage of this system is that the bottom floor is allowed a great deal of movement from its initial position, potentially allowing large variations in crop material volume to enter in the bale forming chamber. Large variations in crop material can cause uneven bale formation and improper or incomplete cutting of crop material.

The instant application addresses these deficiencies by providing a crop collection system that allows a one-sided, limited movement of a bottom floor of a crop feeding channel that both prevents clogging of the feed channel due to occasional high crop material volume, and still provides for proper bale formation.

SUMMARY

The disclosure relates to a harvester assembly comprising: a feeder assembly; a bottom floor assembly; and a crop collection channel positioned therebetween, such crop collection channel having a depth defined by the distance between the feeder assembly and the bottom floor assembly; wherein the feeder assembly comprises a rotor rotatable on at least one fixed axis positioned between a first and a second sidewall, optionally comprising at least one or a plurality of blades or teeth positioned across at least a portion of a lengthwise axis of the feeder assembly capable of spinning on the single rotatable axis during at least a first operational mode; wherein the bottom floor assembly comprises: a hydraulic cylinder; a bottom floor frame comprising at least one face having a concave curvature and extending laterally across the bottom floor assembly, positioned opposite and proximate to the feeder assembly; and one or a plurality of bottom floor plates, covering the at least one face, and defining the concave curvature of the crop collection channel; wherein the hydraulic cylinder comprises a compressible member, such compressible member positioned on either end of the cylinder such that, when the cylinder is subject to a first predetermined amount of compression, the compressible member provides a variable range of motion of the hydraulic cylinder, thereby pivoting the bottom floor assembly at a pivot point positioned at the forward section of the bottom floor assembly and adjusting the depth of the crop collection channel at the rear-most section of the at least one face during at least the first operational mode.

In some embodiments, the bottom floor assembly is capable of a variable range of motion at the rear-most section of the bottom floor plate, and is not capable of a variable range of motion at the front-most section of the bottom floor plate; and wherein the bottom floor assembly is not capable of a variable range of motion at or proximal to the pivot point.

In some embodiments, when the hydraulic cylinder is subject to a second predetermined amount of compression during at least the first operational mode, the compressible member provides a maximum range of motion of the hydraulic cylinder fully compressing the compressible member, thereby pivoting the bottom floor assembly at a pivot point positioned at the bottom of the bottom floor assembly and adjusting the depth of the crop collection channel at the rear-most section of the at least one face to a depth larger than the maximum depth of the crop collection channel achieved at the first predetermined amount of compression.

In some embodiments, when the hydraulic cylinder is subject to a second predetermined amount of compression during at least the first operational mode, the compression causes automatic transition from the first operational mode to a second operational mode, wherein, in such second operational mode, the bottom floor assembly is in a fully open position relative to its distance from the feeder in the first operational mode and allows manual access to the interior of the harvester assembly and/or manual rotation of the rotor.

In some embodiments, the harvester assembly further comprises at least one cutting knife unit supported by the bottom floor frame; wherein the at least one cutting knife unit comprises at least one or a plurality of blades that passes through at least one or a plurality of slots in the bottom floor plate and partially protrude into the crop collection channel.

In some embodiments, the compressible member comprises a spring, a rubber gasket, plastic composite material, or combination thereof.

In some embodiments, the harvester assembly further comprises a second operable mode, wherein the hydraulic cylinder is fully extended, allowing for the loading and/or unloading of cutting knife units and the manual clearing of clogged crop material.

The present disclosure also relates to a harvester comprising a harvester assembly comprising: a feeder assembly; a bottom floor assembly; and a crop collection channel positioned therebetween, such crop collection channel having a depth defined by the distance between the feeder assembly and the bottom floor assembly; wherein the feeder assembly comprises a rotor rotatable on at least one fixed axis positioned between a first and a second sidewall, optionally comprising at least one or a plurality of blades or teeth positioned across at least a portion of a lengthwise axis of the feeder assembly capable of spinning on the single rotatable axis during at least a first operational mode; wherein the bottom floor assembly comprises: a hydraulic cylinder; a bottom floor frame comprising at least one face having a concave curvature and extending laterally across the bottom floor assembly, positioned opposite and proximate to the feeder assembly; and one or a plurality of bottom floor plates, covering the at least one face, and defining the concave curvature of the crop collection channel; wherein the hydraulic cylinder comprises a compressible member, such compressible member positioned on either end of the cylinder such that, when the cylinder is subject to a first predetermined amount of compression, the compressible member provides a variable range of motion of the hydraulic cylinder, thereby pivoting the bottom floor assembly at a pivot point positioned at the forward section of the bottom floor assembly and adjusting the depth of the crop collection channel at the rear-most section of the at least one face during at least the first operational mode.

In some embodiments, the bottom floor assembly is capable of a variable range of motion at the rear-most section of the bottom floor plate, and is not capable of a variable range of motion at the front-most section of the bottom floor plate; and wherein the bottom floor assembly is not capable of a variable range of motion at or proximal to the pivot point.

In some embodiments, when the cylinder is subject to a second predetermined amount of compression during at least the first operational mode, the compressible member provides a maximum range of motion of the hydraulic cylinder fully compressing the compressible member, thereby pivoting the bottom floor assembly at a pivot point positioned at the bottom of the bottom floor assembly and adjusting the depth of the crop collection channel at the rear-most section of the at least one face to a depth larger than the maximum depth of the crop collection channel achieved at the first predetermined amount of compression.

In some embodiments, when the cylinder is subject to a second predetermined amount of compression during at least the first operational mode, the compression causes automatic transition from the first operational mode to a second operational mode, wherein, in such second operational mode, the bottom floor assembly is in a fully open position relative to its distance from the feeder in the first operational mode and allows manual access to the interior of the harvester assembly and/or manual rotation of the rotor.

In some embodiments, the harvester further comprises at least one cutting knife unit supported by the bottom floor frame; wherein the at least one cutting knife unit comprises at least one or a plurality of blades that passes through at least one or a plurality of slots in the bottom floor plate and partially protrude into the crop collection channel.

In some embodiments, the compressible member is a spring, a rubber gasket, plastic composite material, or combination thereof.

In some embodiments, the harvester further comprises a first and a second operable mode, wherein, in the first operable mode, the harvester is configured for harvesting crop material and, in a second operable mode, the hydraulic cylinder is fully extended, allowing for the loading and/or unloading of cutting knife units and/or the manual clearing of clogged crop material.

DETAILED DESCRIPTION OF THE DISCLOSURE

Figure 1:
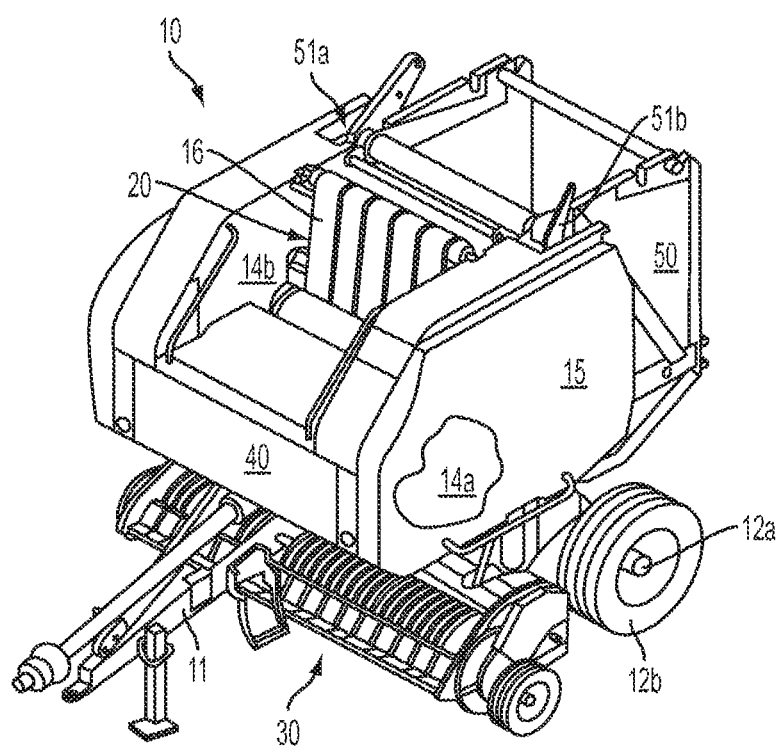
FIG. 1 depicts a static image of a baler.

Various terms relating to the methods and other aspects of the present disclosure are used throughout the specification and claims. Such terms are to be given their ordinary meaning in the art unless otherwise indicated. Other specifically defined terms are to be construed in a manner consistent with the definition provided herein.

As used in this specification and the appended claims, the singular forms "a," "an," and "the" include plural referents unless the content clearly dictates otherwise.

The term "more than 2" as used herein is defined as any whole integer greater than the number two, e.g. 3, 4, or 5.

The term "plurality" as used herein is defined as any amount or number greater or more than 1.

The term "harvester" as used herein is defined as a machine that consolidates and/or packages material so as to facilitate the storage and handling of the material for later use. In some embodiments, the harvester is used to harvest agricultural material. In some embodiments, the harvester is an agricultural baler, a waste baler, or a combine comprising a baling mechanism. in some embodiments, the harvester is a round baler.

The term "material" as used herein is defined as a numerous individual items that are harvested or collected by the harvester. In some embodiments, the material is agricultural crop, such as hay or silage. In some embodiments, the material is biomass.

The term "pickup assembly" as used herein is defined as an element responsible for collecting material from the ground over which the harvester operates. A harvesting assembly includes a mechanism to pick up the material from the ground, and such mechanisms are well known in the agricultural industry. Reference is made, for example, to U.S. Patent Application No. US20130305683, which is incorporated herein by reference in its entirety, that illustrates such mechanisms.

The term "bale chamber" as used herein is defined as any space within the harvester that is capable of forming a bale of harvested material. In some embodiments, the sides of the bale chamber are defined by oppositely facing side walls and the bottom of the bale chamber is defined by at least one floor roll that spans transverse to the sidewalls and that partially supports the weight of the bale in the bale chamber. In some embodiments, the bale chamber is also defined in its front region by an inlet through which harvested material or crop enters. In some embodiments, the front region of a first bale chamber is defined by an inlet or entry point which is in operable connection to a throat of a crop harvesting assembly, such as a pickup or rotary cutter, and which is defined in a space between the first sidewall, the second sidewall, the bale carrier, and a plurality of rollers positioned between and attached to the first and second sidewalls; wherein the plurality of rollers support one or more baling belts. In some embodiments, at least one, at least two, at least three, or at least four floor rollers extend transverse to the opposite sidewalls along the bottom and front of the bale chamber adjacent to the top and bottom of the entry point. In some embodiments, a bale carrier is positioned in and defines the back of the bale chamber by obstructing an outlet in it fully closed position. In some embodiments, the rollers extending beyond the side walls allow the width of the bale chamber to be selectively increased. In some embodiments, side walls which can be moved laterally, i.e., in the direction of the width of the round baler, that enable making bales of different width or the friction between the walls and bale to be reduced when ejecting the bale. In some embodiments, the top portion of the bale chamber is define by the position of one or more baling belts that wrap around a top portion of the crop material as its rotating in the bale chamber. In some embodiments, the baling belts are mounted on a series of rolls positioned above the bale chamber that exact tension on a the bale as it grows.

The term "cutting implement" as used herein is defined as a device involved with the cutting of crop material, including one or a plurality of knives, blades, teeth, gears, grinders, scissors, or rotors. In some embodiments, the harvester assembly is equipped with a "rotor cutter" comprising a rotor, a plurality of knife blades attached to one or more knife units, components to support the knife units and allow for the insertion and removal of the knife units within the bottom floor assembly, and a slotted bottom floor through which the knife blades protrude. In some embodiments, the harvester assembly is equipped with a "rotor feeder" comprising a rotor and a solid bottom floor.

The term "predetermined amount of compression" as used herein is defined as a compression force placed on at least a first hydraulic cylinder and/or at least a first compressible member. Specifically, a "first predetermined amount of compression" is the amount of force necessary to begin to compress the at least a first compressible member that creates variable movement, "give", or "cushion" at the rear end of the bottom floor assembly. A "second predetermined amount of compression" is the amount of force necessary to cause the at least first hydraulic cylinder to move from a closed position to a extended position, moving the bottom floor assembly from a first operational mode to a second operational mode. In the present disclosure, the second predetermined amount of compression is a greater amount of force than the first predetermined amount of compression. In some embodiments, the first and/or second predetermined amount of compression may be set by an operator manually or automatically using a controller operably linked to a computer processor that send electronic information to a hydraulic circuit comprising the mechanical the at least first hydraulic cylinder, such hydraulic circuit directing the flow rate and direction of hydraulic fluid into or out of the at least first hydraulic cylinder.

The term "compressible member" as used herein is defined as an object that applies a tension force or a resistance force across a linear or curved vector when said object is put under compression. In some embodiments, increasing amounts of compression reduce the length of the compressible member across the linear or curved vector. In some embodiments, a compressible member comprises a spring, a rubber gasket, plastic composite material, or combination thereof.

Many of the fastening, connection, processes and other means and components utilized in this disclosure are widely known and used in the field of the disclosure described, and their exact nature or type is not necessary for an understanding and use of the disclosure by a person skilled in the art, and they will not therefore be discussed in significant detail. Furthermore, the various components shown or described herein for any specific application of this disclosure can be varied and the practice of a specific application of any element may already be widely known or used in the art by persons skilled in the art and each will likewise not therefore be discussed in significant detail.

Agricultural balers, such as round balers, are well known in the agricultural industry, and the instant disclosure can be used with substantially any of such machines. Reference is made, for example, to U.S. Pat. Nos. 6,877,304; 6,688,092; 6,644,006 and 6,295,797 that illustrate such balers, the disclosures of which are incorporated herein by reference in their entirety. Embodiments of the present disclosure are particularly well suited, but in no way limited to, use with agricultural balers. The present disclosure may also find utility in agricultural harvesters including, for example, a round baler, a waste baler, a cotton harvester, or a combine. In some embodiments, the combine comprises a baling mechanism.

The present disclosure relates to a harvester assembly comprising a feeder assembly, a bottom floor assembly, and a crop collection channel positioned therebetween, designed to facilitate the transfer and cutting of crop material from a pickup assembly that lifts the crop material off of the ground, to a bale chamber or other crop press that packages the crop material. The feeder assembly comprises a rotor rotatable on at least one fixed axis positioned between a first and a second sidewall, optionally comprising at least one or a plurality of cutting implements positioned across at least a portion of a lengthwise axis of the feeder assembly capable of spinning on the single rotatable axis during at least a first operational mode. In some embodiments, the bottom floor assembly comprises a bottom floor frame, a pivot point at the front of the bottom floor frame, a pair of hydraulic cylinders, and a bottom floor plate that covers the face of the bottom floor frame positioned opposite and proximate to the feeder assembly and defines the bottom floor of the crop collection channel. In order to prevent the clogging or plugging of crop material when a large amount of crop material is passed through the crop collection channel, the bottom floor assembly is designed to allow a variable amount of movement at the rear end of the bottom floor plate. In some embodiments, the pair of hydraulic cylinders comprise a pair of compressible members attached to one end of the pair of hydraulic cylinders, such that when the cylinders are subject to a predetermined amount of compression, the compression conveys a force to the compressible members providing a limited but variable amount of movement, "give", or "cushion," at the rear end of the bottom floor plate.

In some embodiments, the present disclosure relates to a harvester assembly comprising a feeder assembly, a bottom floor assembly, and a crop collection channel. The crop collection channel is positioned between and has a depth defined by the feeder assembly and the bottom floor assembly. The depth at the rear-most end of the crop collection channel defines an outlet, through which crop material exits the crop collection channel and enters a baling chamber. The feeder assembly comprises a rotor rotatable on a fixed axis positioned between a first and a second sidewall, optionally comprising at least one or a plurality of blades or teeth positioned across at least a portion of a lengthwise axis of the feeder assembly configured for spinning on the single rotatable axis during a first operational mode. The bottom floor assembly comprises a pair of hydraulic cylinders, a bottom floor frame comprising a face having a concave curvature and extending laterally across the bottom floor assembly, positioned opposite and proximate to the feeder assembly, and a bottom floor plate, covering the face and defining the concave curvature of the crop collection channel. The bottom floor assembly is configured for a variable range of motion at the rear-most section of the bottom floor plate, and is not capable of a variable range of motion or a substantial variable range of motion at the front-most section of the bottom floor plate, at or proximal to the pivot point. The pair of hydraulic cylinders each comprise compressible members positioned on the top end of each cylinder. In some embodiments, the pair of hydraulic cylinders each comprise compressible members positioned on the bottom end of each cylinder. In some embodiments, the pair of hydraulic cylinders each comprise compressible members positioned on either end of each cylinder.

In some embodiments, crop material present in the crop collection channel places pressure on the bottom floor plate, and therefore the entire bottom floor assembly, causing compression on the pair of hydraulic cylinders and compressible members. Increasing amounts of crop material present in the crop collection channel causes increasing amounts of pressure, and therefore increasing amounts of compression of the one or plurality of compressible members. In some embodiments, during a first operational mode of the bottom floor assembly, when crop material present in the crop collection channel places enough pressure on the bottom floor plate such that the pair of hydraulic cylinders is subject to a first predetermined amount of compression, a pair of compressible members provides a variable range of motion at the rear-most section of the bottom floor plate by allowing the bottom floor assembly to pivot around the pivot point at the front end of the bottom floor assembly. The variable range of motion at the rear-most section of the bottom floor plate allows for a variable size of the outlet of the crop collection channel. As the outlet of the crop collection channel increases in size, larger amounts of crop material can exit the crop collection channel. If the compression on the hydraulic cylinders is reduced to an amount below the first predetermined amount of compression, for example, because of less crop material present in the crop collection channel, one or a plurality of compressible members cease to provide the variable range of motion, and the outlet of the crop collection channel returns to its original size and depth.

In some embodiments, during the first operation mode of the bottom floor assembly, there can be enough crop material present in the crop collection channel such that the pressure on the bottom floor plate causes compression on the pair of hydraulic cylinders beyond the first predetermined amount of compression to a larger second predetermined amount of compression. A second predetermined amount of compression causes automatic transition from the first operational mode to a second operational mode, wherein, in such second operational mode, the bottom floor assembly is in a fully open position relative to its distance from the feeder in the first operational mode and allows manual access to the interior of the harvester assembly.

In some embodiments, the cutting implements are operably connected to the bottom floor assembly and do not maintain a static position, moving instead with the bottom floor assembly during both the first and/or the second operational modes.

In some embodiments, the cutting implements are operably connected to the bottom floor assembly and maintain a static or substantially static position in the first or second operational mode. In some embodiments, the bottom floor assembly does not comprise a slotted guide or other device that allows for the movement of a pivot point of the bottom floor assembly. In some embodiments, the pivot point located at the front end of the bottom floor assembly is static in position, allowing for substantial movement only at the rear end of the bottom floor assembly, and therefore allowing for a substantial increase in depth only at the exit of the crop collection channel.

Referring to FIG. 1, a generally well-known round baler 10 is shown to include a main frame terminating forwardly in a tongue 11 and rearward slightly beyond a transverse axle 12a to which a pair of wheels 12b (only one shown) is mounted, thus forming a wheel supported main frame (not shown in detail). The main frame supports a series of belts 16 and floor rolls (not shown), which together with a first sidewall 14a (shown in the breakout) behind and generally parallel to cover panel 15 and a second sidewall 14b, collectively forming a bale-forming chamber 20. Cut crop material is picked up by transverse pickup 30 and fed through a harvesting assembly (not shown) into bale-forming chamber 20 where it is formed into a cylindrically shaped ball (not shown) by a series of conveyor belts 16. The bale is then optionally wrapped with twine or a net wrapping material dispensed from a wrapping mechanism generally behind shield 40. Upon completion of the optional wrapping process, the tailgate 50 pivots upwardly about pivot points 51a, 51b and the bale is discharged onto the ground.

Figure 2A:
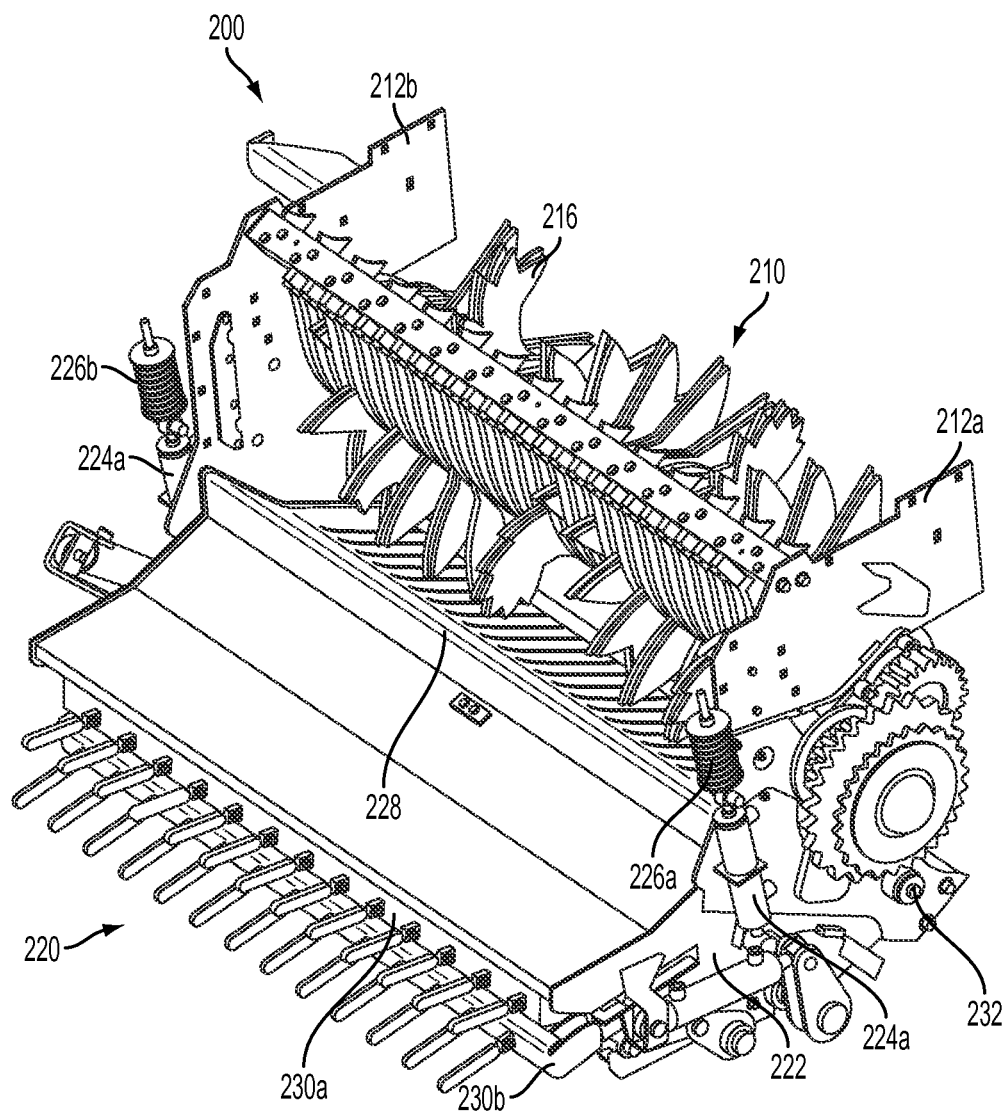
FIGS. 2A and 2B depicts a harvesting assembly in a first operational mode.
Figure 2B:
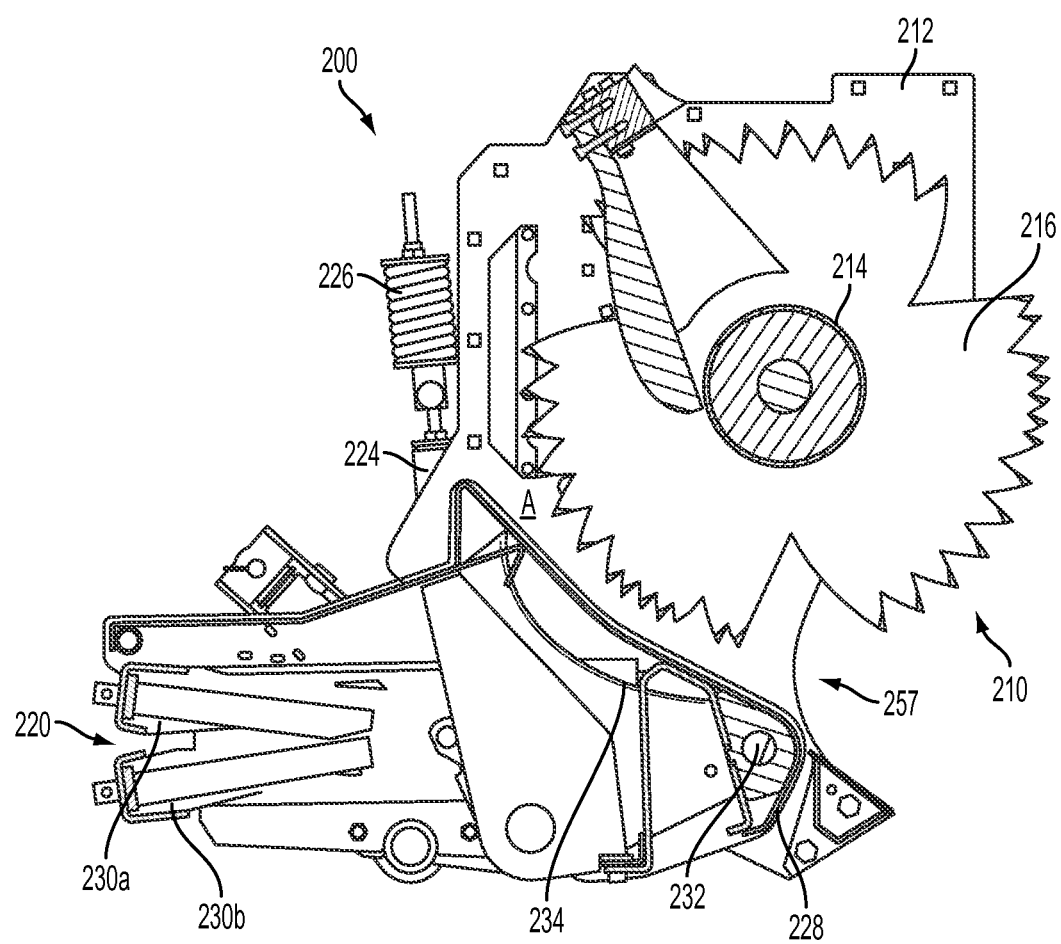

FIGS. 2A and 2B depict an exemplary embodiment of a harvesting assembly, generally designated 200, in a first operational mode. The harvester assembly 200 comprises a feeder assembly generally designated 210 and a bottom floor assembly generally designated 220. In FIG. 2A, the harvesting assembly 200 is shown from an upward and rearward projection, and crop material (not shown) would enter from the upper-right hand side of the illustration. The feeder assembly 210 comprises a pair of sidewalls 212a, 212b, between which a rotor (not shown) and a series of blades 216 rotates along an axis. The bottom floor assembly 220 comprises a bottom floor frame 222, upon which is attached a pair of hydraulic cylinders 224a, 224b, a pair of compressible members 226a, 226b, a bottom floor plate 228, and two cutting knife units 230a, 230b. In the depicted embodiment, the harvesting assembly 200 comprise a pair of compressible members 226a, 226b are springs preset to a predetermined tension. The bottom floor assembly 220 is configured for radial movement around a pivot point 232 located towards the front of the bottom floor assembly. The pivot point 232 (only one shown) mechanically links the bottom floor assembly 220 with the sidewalls 212a, 212b of the feeding assembly 210 by a member such as a rod, pin, or rotatable bolt.

FIG. 2B depicts the cross-section of the harvesting assembly 200 in a first operational mode. Crop material would enter from the right hand side of the illustration through an inlet 257. In this perspective, the rotor 214 of the feeding assembly 210 is more visible, as is the bottom floor plate 228 of the bottom floor assembly 220. The distance between the bottom floor plate 228 and the exterior edge of the rotor 214 defines the depth of the crop collection channel.

In the first operational mode depicted in FIGS. 2A and 2B, the hydraulic cylinder 224 is compressed, and the bottom floor plate 228 is in close proximity to the blades 216 of the feeding assembly 210. Crop material enters into the crop collection channel from the right hand side of the depicted illustrations through inlet 257. As it passes through the crop collection channel, crop material is cut by a blade 216 and, optionally, by the knife blades 234 of the knife units 230a and 230b if such knife blade is in an engaged position as determined by an operator. As crop material enters the crop collection channel it exerts pressure on the bottom floor plate 228. If too much crop material enters the crop collection channel at a given time, the pressure on the bottom floor plate 228 may exceed the tension of the compressible members 226, causing the bottom floor assembly to pivot downward around the pivot point 232. The majority of the radial movement occurs at the rearward end of the bottom floor assembly 220, such that the rearward end A of the bottom floor plate 228 is moved away from the rotor 214 and blades 216. Substantially no movement occurs at the front of the bottom floor plate 228 by the pivot point 232. The downward movement of the floor assembly floor plate increases the volume of the rear end of the crop collection channel, allowing the larger amount of crop material to pass through without plugging or clogging the harvester. When the larger amount of crop material has passed through the crop collection channel, tension from the compressible members 226 returns the bottom floor assembly 220 to its original position.

Figure 3A:
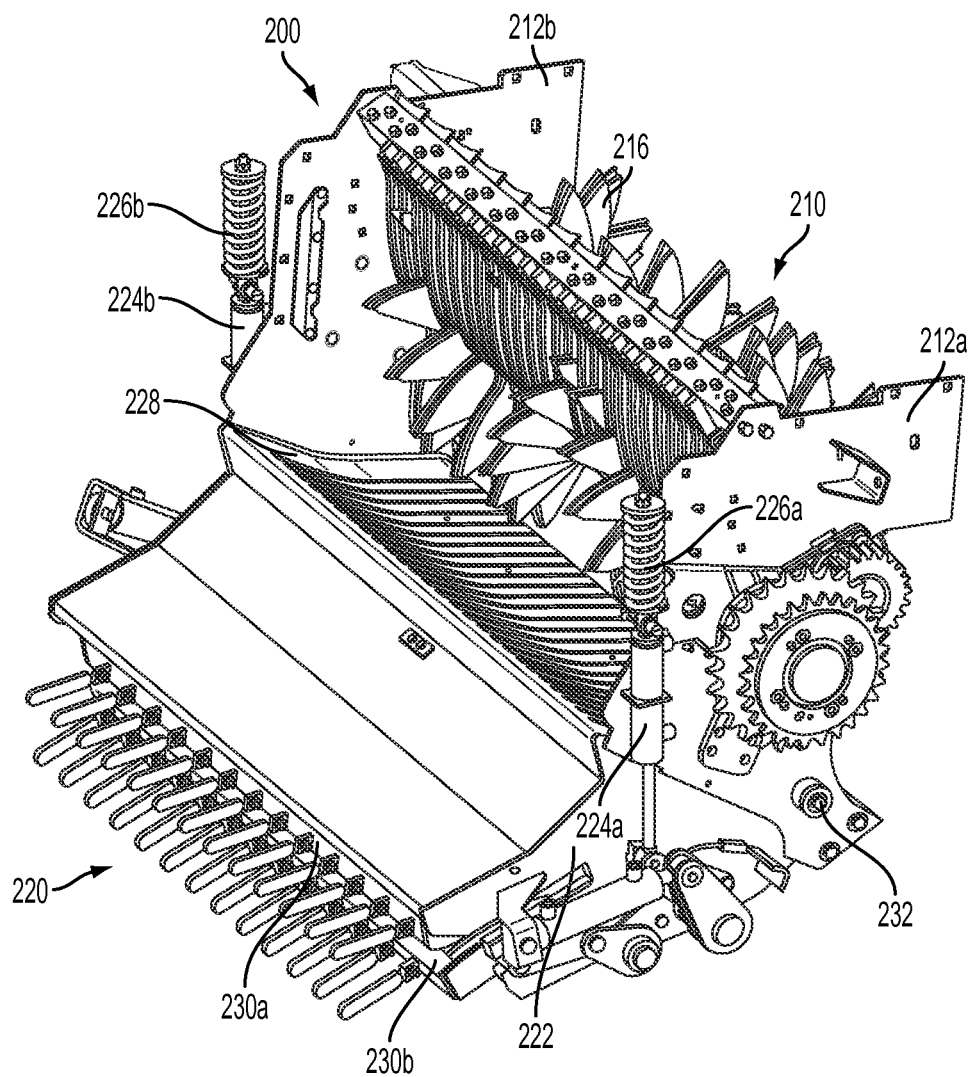
FIGS. 3A and 3B depicts a harvesting assembly in a second operational mode.
Figure 3B:
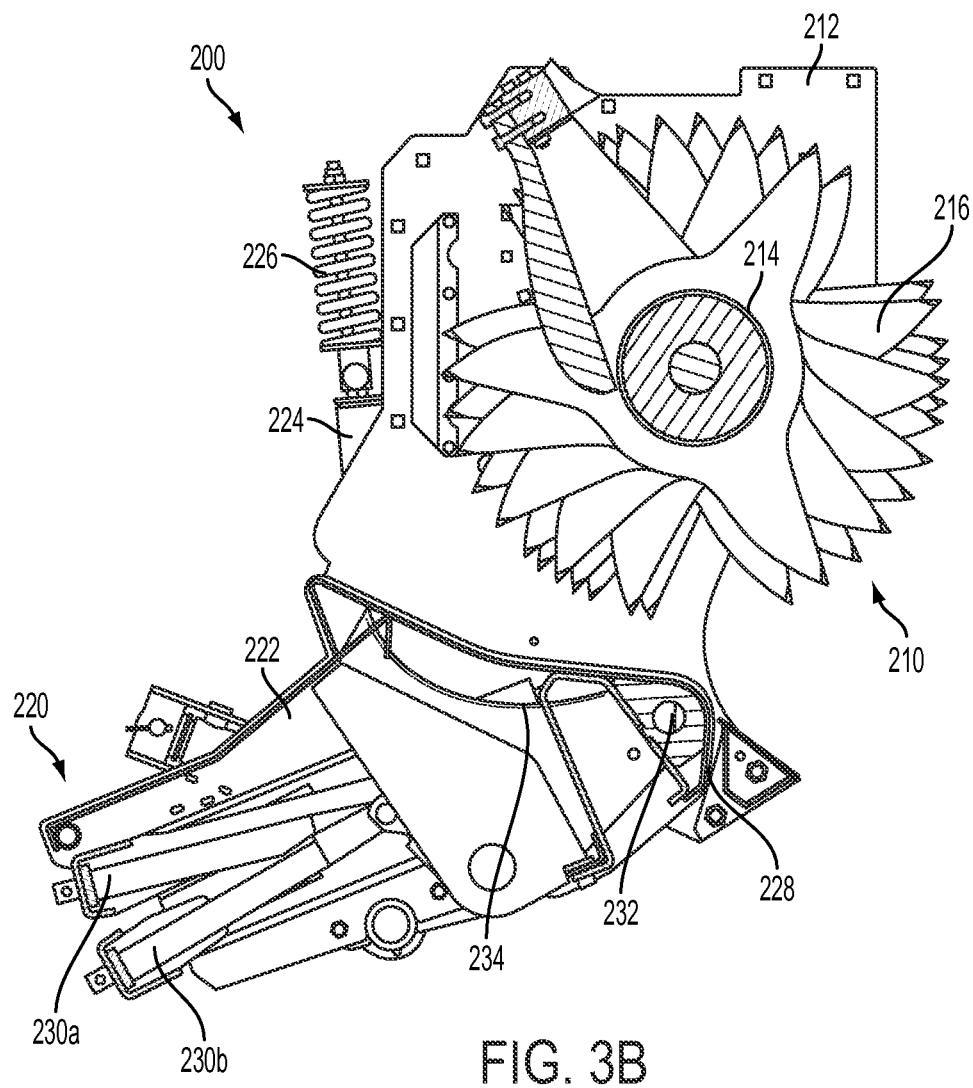

FIGS. 3A and 3B depict a harvesting assembly 200 in a second operational mode. In FIG. 3A, the harvesting assembly 200 is shown from an upward and rearward projection, and crop material (not shown) would enter from the upper-right hand side of the illustration. The feeder assembly 210 comprises a pair of sidewalls 212a, 212b, between which a rotor (not shown) and a series of blades 216 rotate along an axis. The bottom floor assembly 220 comprises a bottom floor frame 222, upon which a pair of hydraulic cylinders 224a, 224b, a pair of compressible members 226a, 226b, a bottom floor plate 228. Two cutting knife units 230a and 230b are attached. In the depicted embodiment, the compressible members 226a, 226b are springs preset to a tension. The bottom floor assembly 220 is capable of radial movement around a pivot point 232 located towards the front of the bottom floor assembly. The pivot point 232 mechanically links the bottom floor assembly 220 with the sidewalls 212 of the feeding assembly 210.

FIG. 3B depicts the cross-section of the harvesting assembly 200 in a second operational mode. Crop material would enter from the right hand side of the illustration. In this embodiment, the rotor 214 of the feeding assembly 210 is more visible, as is the bottom floor plate 228 of the bottom floor assembly 220. The distance between the bottom floor plate 228 and the exterior edge of the rotor 214 defines the depth of the crop collection channel, which can be seen is much greater than the distance between the bottom floor plate 228 and the exterior edge of the rotor 214 in the first operational mode (see FIG. 2A).

In the second operational mode depicted in FIGS. 3A and 3B, the hydraulic cylinder 224 and compressible member 226 are maximally extended. In this position, the harvester would be automatically shut off. In the second operational mode, the bottom floor assembly 220 is maximally pivoted away from the feeding assembly 210. In this position, it is possible the load and unload knife units 230a and 230b from the bottom floor frame 222. It is also possible to manually remove any clogged or plugged crop material from the crop collection channel, for example, by manual rotation of the rotor 214.

Moving between the first operational mode as depicted in FIGS. 2A and 2B and the second operational mode as depicted in FIGS. 3A and 3B can occur in several ways. In some embodiments, an operator manually extends the hydraulic cylinders 224 via a controller, pivoting the bottom floor assembly 220 to its farthest point away from the feeding assembly 210. In some embodiments, a pressure sensor determines an amount of crop material has entered into the crop collection channel via pressure on the bottom floor plate 228, and automatically extends the hydraulic cylinder 224a and compresses the compressible member 226a (second compressible member not depicted). In some embodiments, moving the bottom floor assembly 220 from the first operational mode to the second operational mode causes the harvester to automatically shut off via a switch being triggered by the movement of the bottom floor frame 222. In some embodiments, the switch is in electronic communication with a computer processor and a controller, such switch triggering a signal to be sent to the processor that indicates operation of the harvester in the second operational mode.

Figure 4:
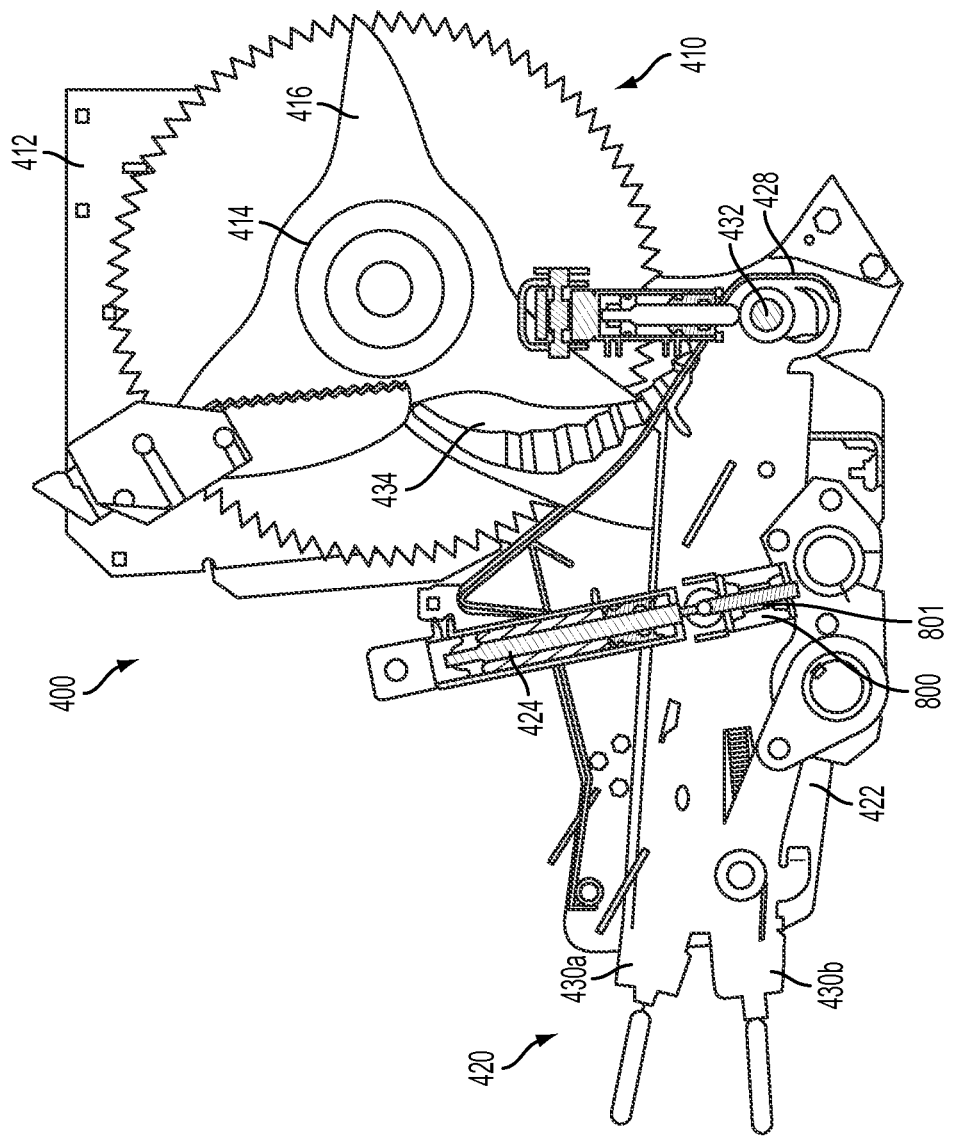
FIG. 4 depicts an alternative embodiment of the compressible member in a harvesting assembly.

FIG. 4 depicts an alternate embodiment of a cross section of a harvesting assembly 400 in a first operational mode, with a different arrangement of a hydraulic cylinder 424 and compressible members 800 and 801. Crop material would enter from the right hand side of the illustration. In this embodiment, the feeder assembly 410, comprises a pair of sidewalls 412, and a rotor 414 with a series of blades 416. The bottom floor assembly 420 comprises a bottom floor frame 422, a pair of hydraulic cylinders 424, compressible members 800 and 801, and a bottom floor plate 428. Two cutting knife units 430a and 430b are attached, and at least one knife blade 434 is shown. In the depicted embodiment, the compressible members 800 and 801 are located at the bottom of the hydraulic cylinders 424. In the depicted embodiment, the compressible members 800 and 801 consist of an external rubber gasket 800 and an internal metal gasket 801. The external rubber gasket 800 exerts a tension upon the bottom floor assembly 420. If a quantity of crop material enters the crop collection channel and creates a force that exceeds a first predetermined amount of force at any given time, the pressure on the bottom floor plate 428 may overcome the tension of the external rubber gasket 800, causing the bottom floor assembly to pivot downward around the pivot point 432. The internal metal gasket 801 limits the amount of downward movement caused by pressure on the bottom floor plate 428.

Figure 5:
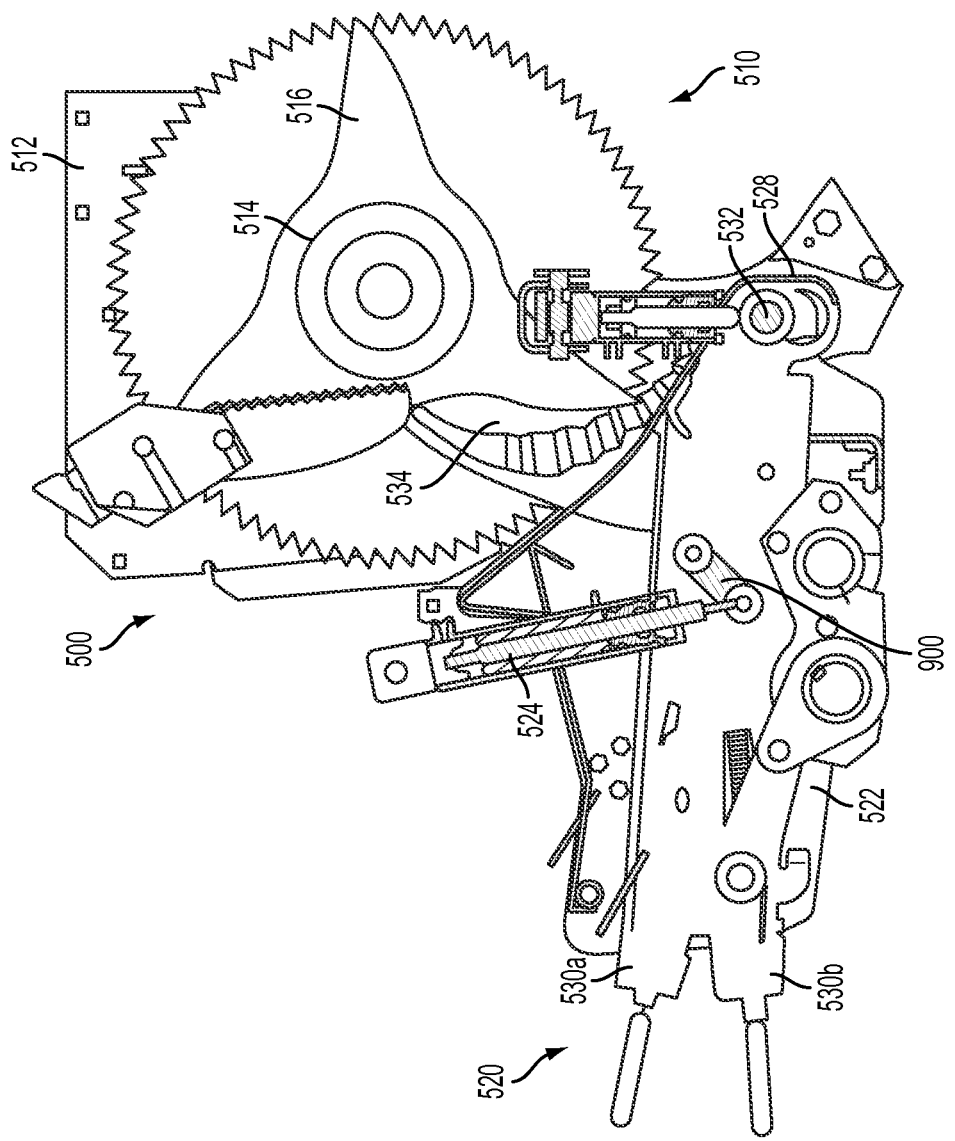
FIG. 5 depicts another alternative embodiment of the compressible member in a harvesting assembly.

FIG. 5 depicts an alternate embodiment of a cross section of a harvesting assembly 500 in a first operational mode, with a different arrangement of the hydraulic cylinder 524 and compressible member 900. Crop material would enter from the right hand side of the illustration. In this embodiment, the feeder assembly 510, comprises a pair of sidewalls 512, and a rotor 514 with a series of blades 516. The bottom floor assembly 520 comprises a bottom floor frame 522, a pair of hydraulic cylinders 524, compressible member 900, and a bottom floor plate 528. Two cutting knife units 530*a* and 530*b* are attached, and at least one knife blade 534 is shown. In the depicted embodiment, the compressible member 900 is not positioned within a hydraulic cylinder, but rather is mechanically connected to the hydraulic cylinder 524 and is oriented laterally to, orthogonally to, or substantially orthogonally to the hydraulic cylinder 524. In the depicted embodiment, the compressible member 900 comprises a plastic composite material. The compressible member 900 is operably attached to the bottom floor assembly 520 by a fastener at one end, and to the hydraulic cylinder 524 by a coupling at the other end. The compressible member 900 exerts a tension upon the bottom floor assembly 520, and, if too much crop material enters the crop collection channel at a given time, the pressure on the bottom floor plate 528 may overcome the tension of the external compressible member 900, causing the bottom floor assembly to pivot radially downward around the pivot point 532.

In some embodiments, the harvester and systems disclosed herein comprise a controller that operates and is in electronic communication with one or more valves and sensors that regulate fluid flow and pressure in a hydraulic circuit. In some embodiments, the hydraulic circuit is in fluid communication with a set of hydraulic cylinders operably connected to a bottom floor assembly. In some embodiments, the hydraulic circuit is configured to adjust the position of the set of hydraulic cylinders, such that the bottom floor assembly moves between a first operational mode and a second operational mode.

Having described a series of embodiments, it will become apparent that various modifications can be made without departing from the scope of the disclosure as defined in the accompanying claims. Various publications, including patents, published applications, technical articles and scholarly articles are cited throughout the specification. Each of these cited publications is incorporated by reference herein in its entirety

What is claimed is:

1. A harvester assembly comprising:
   a feeder assembly;
   a bottom floor assembly; and
   a crop collection channel positioned therebetween, said crop collection channel having a depth defined by the distance between the feeder assembly and the bottom floor assembly;
   wherein the feeder assembly comprises a rotor rotatable on at least one fixed axis positioned between a first and a second sidewall, the rotor comprising at least one or a plurality of blades or teeth configured for spinning on the at least one fixed axis during at least a first operational mode;
   wherein the bottom floor assembly comprises:
      a floor frame portion comprising at least one face extending laterally across the bottom floor assembly, positioned opposite and proximate to the feeder assembly; and
      one or a plurality of bottom floor plates, covering the at least one face, and defining a lower surface of the crop collection channel;
      a plate adjustment assembly comprising at least a first hydraulic cylinder and an attached at least a first compressible member, the plate adjustment assembly connected between the floor frame portion and the one or a plurality of bottom floor plates for controlling the position of the one or a plurality of bottom floor plates with respect to the floor frame portion;
   the at least a first compressible member is positioned on either end of the at least a first hydraulic cylinder such that, when the at least a first hydraulic cylinder is subject to a first predetermined amount of compression, the at least a first compressible member provides a variable range of motion of the one or a plurality of bottom floor plates independent of movement of a rod of the hydraulic cylinder, thereby pivoting the bottom floor assembly at a pivot point positioned at the forward section of the bottom floor assembly and adjusting the depth of the crop collection channel at the rear-most section of the at least one face during at least the first operational mode.

2. The harvester assembly of claim 1, wherein the bottom floor assembly is capable of a variable range of motion at the rear-most section of the bottom floor plate, and is not capable of a variable range of motion or a substantial variable range of motion at the front-most section of the bottom floor plate; and wherein the bottom floor assembly is not capable of a substantial range of motion at or proximal to the pivot point.

3. The harvester assembly of claim 1, wherein, when the at least a first hydraulic cylinder is subject to a second predetermined amount of compression greater than the first predetermined amount of compression during at least the first operational mode, the at least first compressible member provides a maximum range of motion of the at least a first hydraulic cylinder fully compressing the at least a first compressible member, thereby pivoting the bottom floor assembly at a pivot point positioned at the bottom of the bottom floor assembly and adjusting the depth of the crop collection channel at the rear-most section of the at least one face to a depth larger than the maximum depth of the crop collection channel achieved at the first predetermined amount of compression.

4. The harvester assembly of claim 3, wherein, when the at least a first hydraulic cylinder is subject to a second predetermined amount of compression during at least the first operational mode, the compression causes automatic transition from the first operational mode to a second operational mode, wherein, in such second operational mode, the bottom floor assembly is in a fully open position relative to its distance from the feeder in the first operational mode and allows manual access to the interior of the harvester assembly and/or manual rotation of the rotor.

5. The harvester assembly of claim 1 further comprising at least one cutting knife unit supported by the floor frame portion; wherein the at least one cutting knife unit comprises at least one or a plurality of blades that passes through at least one or a plurality of slots in the bottom floor plate and partially protrude into the crop collection channel.

6. The harvester assembly of claim 1, wherein the at least a first compressible member comprises a spring, a rubber gasket, plastic composite material, or combination thereof.

7. The harvester assembly of claim 1 further comprising a second operable mode, wherein the at least a first hydraulic cylinder is fully extended, allowing for the loading and/or unloading of cutting knife units and the manual clearing of clogged crop material.

8. A harvester comprising a harvester assembly comprising:
   a feeder assembly;
   a bottom floor assembly; and
   a crop collection channel positioned therebetween, said crop collection channel having a depth defined by the distance between the feeder assembly and the bottom floor assembly;
   wherein the feeder assembly comprises a rotor rotatable on at least one fixed axis positioned between a first and a second sidewall, the rotor comprising at least one or a plurality of blades or teeth capable of spinning on the at least one fixed axis during at least a first operational mode;
   wherein the bottom floor assembly comprises
      at least a first hydraulic cylinder assembly;
      a frame portion comprising at least one face having a curvature and extending laterally across the bottom floor assembly, positioned opposite and proximate to the feeder assembly; and
      one or a plurality of bottom floor plates, covering the at least one face, and defining a lower surface of the crop collection channel;
   wherein the at least a first hydraulic cylinder assembly comprises at least a first compressible member, said compressible member positioned on either end of at least a first hydraulic cylinder such that, when the at least a first hydraulic cylinder is subject to a first predetermined amount of compression, the at least a first compressible member provides a variable range of motion with respect to a rod of the at least a first hydraulic cylinder, thereby pivoting the bottom floor assembly at a pivot point positioned at the forward section of the bottom floor assembly and adjusting the depth of the crop collection channel at the rear-most section of the at least one face during at least the first operational mode.

9. The harvester of claim 8, wherein the bottom floor assembly is capable of a variable range of motion at the rear-most section of the bottom floor plate, and is not capable of a variable range of motion at the front-most section of the bottom floor plate; and wherein the bottom floor assembly is not capable of a variable range of motion at or proximal to the pivot point.

10. The harvester of claim 8, wherein, when the at least a first hydraulic cylinder is subject to a second predetermined amount of compression during at least the first operational mode, the at least a first compressible member provides a maximum range of motion of the at least a first hydraulic cylinder fully compressing the at least a first compressible member, thereby pivoting the bottom floor assembly at a pivot point positioned at the bottom of the bottom floor assembly and adjusting the depth of the crop collection channel at the rear-most section of the at least one face to a depth larger than the maximum depth of the crop collection channel achieved at the first predetermined amount of compression.

11. The harvester of claim 10, wherein, when the at least a first hydraulic cylinder is subject to a second predetermined amount of compression during at least the first operational mode, the compression causes automatic transition from the first operational mode to a second operational mode, wherein, in such second operational mode, the bottom floor assembly is in a fully open position relative to its distance from the feeder in the first operational mode and allows manual access to the interior of the harvester assembly and/or manual rotation of the rotor.

12. The harvester of claim 8 further comprising at least one cutting knife unit supported by the frame portion; wherein the at least one cutting knife unit comprises at least one or a plurality of blades that passes through at least one or a plurality of slots in the bottom floor plate and partially protrude into the crop collection channel.

13. The harvester of claim 8, wherein the at least a first compressible member is a spring, a rubber gasket, plastic composite material, or combination thereof.

14. The harvester of claim 8 further comprising a second operable mode, wherein the at least a first hydraulic cylinder is fully extended, allowing for the loading and/or unloading of cutting knife units and the manual clearing of clogged crop material.

* * * * *